US008701625B2

(12) United States Patent
Petersen

(10) Patent No.: US 8,701,625 B2
(45) Date of Patent: Apr. 22, 2014

(54) DIESEL ENGINE, PREDETERMINED BREAKING COMPONENT FOR DIESEL ENGINE AS WELL AS METHOD FOR AVOIDING DAMAGES TO A DIESEL ENGINE

(75) Inventor: Arne Kvistgaard Petersen, Dragoer (DK)

(73) Assignee: Man Diesel & Turbo, Filial AF Man Diesel & Turbe SE, Tyskland, Copenhagen (DK)

( * ) Notice: Subject to any disclaimer, the term of this patent is extended or adjusted under 35 U.S.C. 154(b) by 270 days.

(21) Appl. No.: 13/140,883

(22) PCT Filed: Dec. 16, 2009

(86) PCT No.: PCT/EP2009/009018

§ 371 (c)(1), (2), (4) Date: Sep. 7, 2011

(87) PCT Pub. No.: WO2010/078927

PCT Pub. Date: Jul. 15, 2010

(65) Prior Publication Data

US 2011/0315132 A1 Dec. 29, 2011

(30) Foreign Application Priority Data

Dec. 19, 2008 (DE) ........................ 10 2008 063 968

(51) Int. Cl.
*F02B 77/08* (2006.01)
*F16K 17/14* (2006.01)

(52) U.S. Cl.
USPC .................. 123/198 D; 137/68.25; 137/68.27

(58) Field of Classification Search
USPC ............. 123/198 D, 196 S; 137/68.19, 68.23, 137/68.25, 68.27
See application file for complete search history.

*Primary Examiner* — Lindsay Low
*Assistant Examiner* — Syed O Hasan
(74) *Attorney, Agent, or Firm* — Bacon & Thomas, PLLC

(57) ABSTRACT

A two-stroke crosshead large Diesel engine, comprising at least one combustion chamber, which is enclosed on multiple sides by a cylinder, and by at least one upper side of at least one piston moving up and down in the cylinder, which form an outer wall for the combustion chamber. The combustion chamber on its outer wall presents a predetermined breaking point, which is suited to protect the Diesel engine against possible damages which might be caused by an undesirably high overpressure (py) of gases in the combustion chamber during a malfunction of the Diesel engine. The predetermined breaking point comprises a predetermined breaking pressure (ps) below the overpressure (py) above which damages are expected, and above a combustion chamber normal pressure (pn) provided at a maximum during normal engine operation conditions.

37 Claims, 8 Drawing Sheets

DIESEL ENGINE, PREDETERMINED BREAKING COMPONENT FOR DIESEL ENGINE AS WELL AS METHOD FOR AVOIDING DAMAGES TO A DIESEL ENGINE

TECHNICAL FIELD

The present invention concerns a Diesel engine, in particular a two stroke crosshead large Diesel engine, as well as a predetermined breaking component for such Diesel engine. Moreover, the invention concerns a method for avoiding damages to a Diesel engine.

BACKGROUND DISCUSSION

On Diesel engines, in particular two-stroke large Diesel engines, as used as ship propulsion systems or for power stations, severe damages and also hazards to the operating personnel have occurred in the past, if e.g. the cylinder head lifts off due to overpressure occurring in the combustion chamber. In this process the cylinder bolts, by means of which the cylinder head is screwed onto the cylinder, stretch due to an excessive pressure build-up in the gas volume between cylinder head, internal cylinder walls and the piston moving up and down in the cylinder or they even burst because the cylinder bolts are not designed for such an overpressure.

When the cylinder head lifts off, an explosive escape of gas occurs between cylinder head and cylinder where by loud detonation up to 170 dB hot gas, often in the form of flames, escapes uncontrolled which does not only jeopardize the operating personnel but also the sealing surfaces on the cylinder head and/or on the cylinder facing towards each other or the sealing arranged in between are damaged so that the cylinder head must be removed in an expensive repair in order to replace the sealing and/or rework the sealing surfaces. Even if the cylinder is of a type without removable cylinder (e.g. so-called Bugatti engine), a dangerous pressure build-up described above may result in a damage or deformation of internal engine component parts such as e.g. a bent piston rod or even an offset of the crankshaft connections entailing long engine downtimes and high repair cost.

Large vessel insurance companies stipulate already today that generic ship engines must be protected against such damages by means of safety valves. The safety valves normally used for large Diesel engines, however, cannot reliably prevent the damages described above but mostly have only the effect of an indicator and/or a whistle warning of an upcoming liftoff of the cylinder head and/or cylinder damage but do not prevent it. Because conventional safety valves operate too slow for it or would have to be of such a large size that their use is not workable. Moreover, such safety valves and whistles have been developed in order to indicate continuously worsening undesirable developments but they are not suitable for warning of an overpressure such as it may occur e.g. in the event of a spontaneous and unforeseeable failure or error of an electronic engine management.

As is known, pressure relief equipment such as fusible plugs, predetermined breaking points or burst disks are already used in low-pressure environments. For example, from the Japanese patent JP S 45-037498B a predetermined breaking component is known serving for protection against blocking of a engine of an agricultural machine, which has fallen into the water, due to water penetrated into the combustion chamber which due to its incompressibility prevents further piston movement.

SUMMARY OF THE INVENTION

Therefore it is an object of the present invention to provide a Diesel engine, in particular a two-stroke crosshead large Diesel engine with longitudinal scavenging, having a lower risk potential in operation at likewise lower maintenance cost, as well as to provide a predetermined breaking component for it, and a method by means of which damages of a Diesel engine can be avoided.

This object is solved with respect to the predetermined breaking component, with respect to the Diesel engine and with respect to a method for avoiding damages of the Diesel engine.

The Diesel engine has at least one combustion chamber, which is enclosed by a cylinder on multiple sides and by at least one upper side of at least one piston moving up and down in the cylinder which form an outer wall for the combustion chamber, wherein the combustion chamber comprises a predetermined breaking point on the outer wall thereof. Thus, it can be a Diesel engine with one piston or two pistons moving against each other.

According to the invention, the Diesel engine has a predetermined breaking point suited to protect the Diesel engine against possible damage that can be caused by an undesirably high overpressure of gases in the combustion chamber during a malfunction of the Diesel engine, wherein the predetermined breaking point has a predetermined breaking pressure below the overpressure above which damages can be expected, and above a combustion chamber normal pressure foreseen maximally under normal engine operation conditions. The predetermined breaking point can be advantageously formed on a predetermined breaking component which is provided for closing an emergency relief duct leading through an external wall of the Diesel engine combustion chamber. For this purpose the Diesel engine in the external combustion chamber wall comprises an emergency relief duct closed by the predetermined breaking component.

By means of such a Diesel engine and/or a corresponding predetermined breaking component, which comprises the predetermined breaking point, moreover the inventive method for avoiding damages of a Diesel engine can be realized which is characterized in that for preventing damages, which might occur by an undesirably high overpressure of gases in a combustion chamber during a malfunction of the Diesel engine, at least one inventive predetermined breaking component is provided in the outer wall of at least one combustion chamber and/or the Diesel engine designed according to the invention is used.

Advantageously this permits to reliably prevent the damages described above on gas escape between cylinder and cylinder head but also possible deformation of internal parts, which can likewise be caused by a destructive combustion overpressure in the combustion chamber such as e.g. a bending of the piston rod, the crosshead elements or the connecting rod as well as partly occurring offset in shrink joints on the crankshaft etc. This is because before such a destructive overpressure can build up, the predetermined breaking point will break, whereby another pressure increase is at least substantially prevented, since further pressure build-up in the combustion chamber due to continuous combustion of injected fuel and possibly further compression is counteracted by the pressure decrease on the broken predetermined breaking point. Breakage of the predetermined breaking point is acceptable here and clearly to be preferred to the severe damages described above, which have to be expected otherwise, because it is merely a far cheaper repair easy to perform of a damage precisely defined in advance.

Predetermined breaking points can be manufactured with a predetermined breaking pressure precisely defined within narrow limits. Thus, it is possible in the entire temperature range occurring in the combustion chamber, i.e. in the event of a warm engine as well as in the event of a cold engine, to maintain the predetermined breaking pressure greater than a threshold value and lower than a limit pressure, with the threshold pressure being greater than a normal combustion chamber pressure occurring maximally due to compression and/or combustion, and the limit pressure being lower than a lowest overpressure as from which damages on the engine are to be expected. Thus, the safety device of the present invention works in every engine operating condition as desired, hence not only in full load operation but also in partial load operation.

In order to prevent a fatigue break of the predetermined breaking point, moreover an operating life of the predetermined breaking point can be determined and/or predefined within which it can definitely be expected that the predetermined breaking pressure is greater than the threshold pressure and lower than the limit pressure.

Advantageously, the predetermined breaking point can be formed here on a ring-shaped circumferential border around a predetermined breaking plate portion, with the border compared with the surrounding outer wall being thin-walled and convexly curved towards the combustion chamber.

The predetermined breaking point and/or the emergency relief duct provided with the predetermined breaking component could be provided here on the piston surface facing towards the combustion chamber. Likewise imaginable would be for it each point of the cylinder. In the event of engines with cylinders having a cylinder liner closed on the end with a cylinder head, however, it is advantageous, if the predetermined breaking point and preferably the emergency relief duct passing out of the combustion chamber and closed with the predetermined breaking component is provided on the cylinder head. For cylinders of generic large engines normally the valve seat and the drive of the exhaust valve are integrated into an easily replaceable, compact, specific assembly. An emergency relief duct is normally not provided in the specific assembly. Preferably the predetermined breaking component is easily accessible and can be simply replaced at the end of its service life—broken or not broken. Also a repair of a Diesel engine on which a predetermined breaking point provided integrally with the cylinder head is broken can then easily be made so that the engine must be put out of operation only for a short period of time and/or in the case of cylinders, which can be shut off individually, can even continue to run on the other cylinders. Theoretically, however, also an integral predetermined breaking point on the external wall of the combustion chamber would be imaginable.

It is furthermore advantageous, if the predetermined breaking component can be attached to the engine from the outside in order to seal the emergency relief duct. For this purpose, the predetermined breaking component can be formed in the fashion of a plug in order to plug the emergency relief duct or as a lid to be screwed above the emergency relief duct from the outside. But it would likewise be imaginable that the safety device be formed as a self-locking component to be introduced from the internal combustion chamber side into the emergency relief duct. Such a predetermined breaking component could be introduced via a scavenge duct connection on the cylinder bottom when the piston is in a position close to the lower dead center or by an individual bore, e.g. the emergency relief duct itself, if said duct has a suitable shape, e.g. an oval shape, and the predetermined breaking component is lead through the emergency relief duct in a twisted position in relation to the service position.

Another preferred embodiment of the safety device as a separate predetermined breaking component could comprise a cylindrical sleeve portion by means of which the emergency relief duct is plugged in the combustion chamber outer wall as well as an additional lid portion in the fashion of a screw head which sealingly rests on a corresponding sealing surface on the bottom side facing towards the outer wall.

The predetermined breaking component can comprise here a predetermined breaking disk with the predetermined breaking point clamped between two clamping flanges or a circumferential support portion around the predetermined breaking point which is formed integrally with the predetermined breaking plate portion. Alternatively, the predetermined breaking component could only comprise a clamping device by means of which the predetermined breaking disk is e.g. clamped via only one clamping flange against a clamping surface provided on the engine.

If the predetermined breaking component is formed as a lid or with a lid portion comprising a ring-shaped border flange around the emergency relief duct, preferably with a plane sealing surface facing towards the combustion chamber, it can be attached on the engine, preferably on the cylinder head cover, by means of screw studs penetrating the border flange wherein an additional seal can be inserted between the sealing surface on the cylinder head cover and the sealing surface on the lid flange, if this is required. The border flange of the lid can simultaneously serve here as a clamping flange for clamping the predetermined breaking disk against the sealing surface on the engine which again can serve as a sealing ring at the same time.

If the predetermined breaking component, however, is formed as a sleeve plugging the emergency relief duct or alternatively or in addition to the lid and/or the lid portion and/or the clamping device comprises a sleeve portion to be introduced into the emergency relief duct, the sleeve and/or sleeve portion can be provided with an external thread and the emergency relief duct with a corresponding internal thread in order to fix the predetermined breaking component in the emergency relief duct.

The inner surface of the predetermined breaking component and/or its front side facing towards the combustion chamber can have such a shape here that the front side of the predetermined breaking component and the adjacent inner surface of the combustion chamber outer wall are flush, when the predetermined breaking component is in its service position. Thus it can be avoided that the edges of the cylinder head surrounding the emergency relief duct on the inside of the outer wall burn down or melt due to local temperature concentrations. To this end, it would be furthermore advantageous, if the cylinder head is chamfered or rounded on the inside of the combustion chamber outer wall around the emergency relief duct so that the predetermined breaking component need not be introduced into the emergency relief duct entirely up to the inner border of the combustion chamber and nevertheless a flush termination with the inside of the combustion chamber outer wall can be formed.

For predetermined breaking components with, in service position, a front side flush with the inside of the combustion chamber outer wall, it is particularly advantageous, if means are provided in order to ensure a correct rotational position of the predetermined breaking component formed as a plug. Because in that case an otherwise cylindrical plug, which only comprises a specially shaped lobe on its front side in order to terminate flush with the surrounding inside of the combustion chamber outer wall (e.g. in the case of an inclined pattern of the emergency relief duct in relation to the inner surface of the combustion chamber outer wall), can be safely put into the correct service position. In order to prevent that the tip of such a lobe attachment freely projects into the combustion chamber and easily melts down in this wrong rotational position or that the corresponding areas on the inside of the combustion chamber outer wall melt down due to the absence of the matching areas of the lobe attachment, e.g. a suitable, nonsymmetrical pattern of screw-in bores for corresponding screws can be provided. Another possibility would be a precisely matched internal thread length in the emergency relief duct and/or external thread length on the sleeve portion of a plug-type predetermined breaking component comprising on its inside the lobe attachment described above for a flush bearing to the inside of the combustion chamber outer wall and/or corresponding tag lines at the end of the predetermined breaking component distant from the combustion chamber or on the perimeter of its screw head and on the surrounding area on the outside of the combustion chamber outer wall. It would also be imaginable to determine the screw-in depth of the predetermined breaking component by providing the predetermined breaking component with a screw head type flange by means of which it abuts a corresponding bearing surface on the cylinder head and/or an inserted sealing ring when lobe attachment forming the internal front side of the predetermined breaking component is mounted flush to the inside of the combustion chamber outer wall.

Especially for such predetermined breaking components formed as screw-in burst plugs, the surface of the predetermined breaking component facing away from the combustion chamber can comprise moreover a receiving hole for a specifically profiled tool in order to be able to tighten the plug into its correct position in the emergency relief duct and/or its correct tightening torque. The tool receiving hole can be provided here in a portion of the predetermined breaking component which breaks off after having achieved the correct tightening torque so that it is ensured that the predetermined breaking component can be mounted only once. The predetermined breaking component can be formed here e.g. such that after removal of the tool and the broken off portion an outwardly extending, wedge-shaped structure remains with the receiving hole which permits application of a torque only in direction of the opening of the predetermined breaking component.

The above mentioned features for guaranteeing the correct rotational position and/or the correct tightening torque can moreover also be used for differentiating different predetermined breaking components of the same type used in different engine type series with different mechanical design and/or combustion pressure conditions, e.g. by means of suitable, previously screwed-in blocking means which prevent or at least indicate that e.g. a burst plug, which is too long, is screwed in.

Alternatively to the embodiment of the plug-type predetermined breaking component with front side flush with the inside of the outer wall, its front side extending inwardly may also be in non-flush bearing with the inside of the combustion chamber outer wall but in a position slightly retracted into the wall. As a result, by means of the surrounding outer wall the predetermined breaking component is slightly shielded from the radiant heat produced by the combustion in the combustion chamber.

Advantageously however, the predetermined breaking component may also comprise a heat shielding and/or corrosion protective layer by means of which it is shielded on the surface facing towards the combustion chamber from radiant heat in the combustion chamber and also from chemical decomposition processes due to aggressive exhaust gas in the combustion chamber. Such a layer could e.g. be a coating of the ring-shaped sleeve front side but also of the predetermined breaking disk arranged in the sleeve, made from a heat-resistant alloy, with nickel alloys having proven to be particularly resistant to mixture decomposition due to combustion in engines. But also a ceramic insulating layer would be imaginable. It would be likewise imaginable to form the predetermined breaking disk from a heat-resistant material comprising the desired predetermined breaking properties, e.g. likewise from ceramics, in particular, if as a sealing ring it shields the engine outside from the combustion chamber heat.

Another possibility would be to arrange a pressure permeable heat protection material as a heat protection layer in between the combustion chamber and predetermined breaking component which can be provided at the emergency relief duct exit on the combustion chamber side and can then entirely fill out the emergency relief duct as long as the function of the predetermined breaking component to break on overpressure is not impaired. Such a heat protection material and/or such a heat protection layer can be molded on or adhered to (or the like) the predetermined breaking component or can be realized as an independent component part. For example, the heat protection material could be a porous solid body such as for example a metal foam, which insulates the predetermined breaking point against radiant heat in the combustion chamber, or a metal thread mesh and/or metal wool, which absorbs the radiant heat emanating from the combustion chamber and discharges it to the areas of the combustion chamber outer wall arranged around the emergency relief duct. Likewise imaginable would be the use of ceramics or a combination from metal and ceramics as a heat protection material. When the predetermined breaking point breaks or bursts, such a heat protection material is normally expelled from the emergency relief duct together with pieces of the predetermined breaking component.

Moreover, also an active cooling of the predetermined breaking component and/or the predetermined breaking point via supply of a coolant can be provided. A flushing device for flushing the side of the predetermined breaking point and/or the predetermined breaking plate portion facing away from the combustion chamber with a coolant, in particular with cooling water or cooling gas, can serve advantageously for this purpose.

The active cooling system can be configured here as an open system, in particular when using a nontoxic gas such as e.g. the charge air supplied to the cylinder, and can comprise a corresponding coolant feed line plus, if required, a pump as a flushing device.

Also the wet exhaust gas coming from the cylinder is suited as a coolant. Likewise, the cooling water could be used as a coolant. In both cases, the cooling system can be configured as a closed system, with, apart from the coolant feed line, a coolant discharge line being provided leading to a nonhazardous location in the environment or to a corresponding location in the exhaust gas duct (e.g. near an inlet of a compressor) and/or to a water tank. The optional pump can then also be provided as a suction pump on the discharge side.

On the side of the predetermined breaking plate portion facing away from the combustion chamber in built-in condition, an additional cover can be provided in the emergency relief duct which together with the predetermined breaking plate portion delimits a cooling chamber sealed preferably against the wall of the emergency relief duct from coolant outlet. In order to guarantee the function of the predetermined breaking point here, the additional cover should have a predetermined breaking pressure of e.g. some bar which is far lower compared with the predetermined breaking pressure of the predetermined breaking point. Moreover, it can be advantageous to provide a throttle device by means of which the coolant supply can be throttled in response to a breakage of the predetermined breaking point or achieving a specific pressure in the combustion chamber (e.g. the threshold pressure) so that the coolant supply, in particular if liquids are used as a coolant, is then limited to a level which is innocuous for the component parts in the combustion chamber then accessible by the emergency relief duct.

Further possibilities for shielding the predetermined breaking component from the radiant heat in the combustion chamber are for example by forming the emergency relief duct on the combustion chamber side with a buckle or a curvature in order to arrange the predetermined breaking component behind the curvature. Moreover, the diameter of the emergency relief duct in one portion between the inner surface of the combustion chamber outer wall and the front side of the predetermined breaking component facing towards the combustion chamber outer wall could be provided with a slightly smaller inner width than in the more externally located portion plugged by the predetermined breaking component.

It would also be imaginable to manufacture the entire predetermined breaking component from a correspondingly heat-resistant material so that no failure occurs below the desired predetermined breaking pressure even if no heat protection material or no heat protection coating is provided on the predetermined breaking component. But this material would have to comprise also the properties otherwise necessary such as for example the required predetermined breaking pressure within narrow tolerances at manufacturing cost as low as possible.

But it has to be taken into account in this connection that in Diesel engines of the category of the invention, in particular two stroke crosshead large Diesel engines with longitudinal scavenging temperatures of up to 2000° C. occur at the ignition point, which after running up of the engine lead to a heating of the material in the cylinder head outer wall of only 70° to 80° C. which is maintained on this low temperature level by the cooling system. If the predetermined breaking component or the predetermined breaking point is exposed to direct radiant heat in the combustion chamber without additional protective measures, the predetermined breaking plate or burst plate in a test motor with a lid-type predetermined breaking element or component located externally on the cylinder head has heated up at least to 450° C. starting from the low temperature prior to running up of the engine and under permanently changing temperature load during the combustion cycle. But if it is only or mainly exposed to thermal conduction in the wall, it heats up as well only to the wall temperature of 70° C. to 80° C. Also a controlled forced cooling design of the predetermined breaking component could be imaginable.

In order to avoid unnecessary downtimes or replacement of the predetermined breaking component, corresponding measures have to be taken in any case in order that the predetermined breaking point comprises a predetermined breaking pressure, which at any temperature at any time in the engine combustion cycle and/or under normal motor operating condition, namely from engine running up to achieving the operating temperature of the engine, is greater than a threshold pressure and smaller than a limit pressure, with the threshold pressure being greater than a combustion chamber normal pressure occurring at maximum under normal engine operating conditions at the corresponding temperature, and the limit pressure being lower than a lowest overpressure at the temperature above which damage on the engine has to be expected.

Preferably, the predetermined breaking component and/or the engine environment receiving the predetermined breaking point should be designed such that a certain safety still exists, hence such that the threshold pressure is at least by a triggering pressure amount higher than the combustion chamber pressure occurring at maximum under normal engine operating conditions and/or the limit pressure is at least by one safety pressure amount lower than the lowest overpressure where engine damage is to be expected.

For example, a value of 10% of the combustion chamber normal pressure occurring at maximum under normal engine operating conditions could be provided as a triggering pressure amount. Since the pressure where the cylinder bolts used for screwing cylinder liner and cylinder head stretch so far that the cylinder head lifts off, greatly depends on the bolt temperature and this again depends on the dynamic wall temperature and is therefore not always precisely defined, the value for the lowest overpressure should be selected narrowly. For example, as a limit pressure (corresponding to a lowest overpressure less the safety pressure amount) a value of 20% above the value calculated as combustion chamber normal pressure occurring at maximum should be assumed. It is clear that neither the lowest overpressure nor the maximum combustion chamber normal pressure must actually correspond precisely to the pressure values where the engine is just running without damage or where it just explodes. Rather these may also be hypothetical values as long it is ensured that the values assumed are safe or these may be values determined in trials for the combustion chamber normal pressure occurring at maximum and a value for the lowest overpressure estimated to be safe dependent on it.

In trials on a current two stroke crosshead large Diesel engine of the category of the invention, the combustion chamber normal pressure is for example 160 to 200 bar, wherein cylinder pressures of up to 600 bar may occur in the case of provoked mistakes in the injection control and resulting wrong ignition conditions, with such pressure values often causing the liftoff by the cylinder head described above due to a cylinder bolt elongation. Under such conditions, for example, a lower threshold pressure of 220 bar and an upper limit pressure of 250 bar has turned out to be appropriate tolerances for the predetermined breaking pressure.

Another advantageous further embodiment of the invention concerns a safe receiving environment into which the hot gases and possibly chips escape in the case of a breakage of the predetermined breaking point can be discharged.

Due to the required large volume at least for large Diesel engines it would probably be imaginable only in theory to provide an emergency gas collector as an integral part of the predetermined breaking component which connects on the side of the predetermined breaking point facing away from the combustion chamber, so that the emergency relief duct closed with the predetermined breaking point directly opens out into the emergency gas collecting tank. It could be suitable, however, to provide a direction indicator for the gases (to direct them in a safe direction) or a collecting filter for the breaking off pieces of the predetermined breaking point, preferably integral with the predetermined breaking component. Such a direction indicator and/or collecting filter can then either be replaced together with the remaining predetermined breaking component or provided with a new predetermined breaking point, if an engine repair after breakage of the predetermined breaking point occurs. The collecting filter may comprise passages for the escaping hot gas showing in a direction where the hot gas cannot do damage wherein fractions can be retained by means of mesh or grid or the like.

Alternatively, also a common emergency gas collecting tank for several predetermined breaking components can be provided and/or connected to several predetermined breaking components, preferably comprising a closed volume. For example, for an in-line engine where several cylinders are located side-by-side in series, a longitudinal emergency gas collecting tank can be provided, with each of the cylinders being provided with a predetermined breaking component, which is then connected to the common emergency gas collecting tank, so that the emergency relief duct in the case of breakage of the predetermined breaking point each opens out into the common emergency relief duct with a volume of e.g. 8 $m^3$ in the case of a large Diesel engine.

According to an alternative further embodiment a component part already existing on the engine is used as a safe receiving environment which is connected to the emergency relief duct by means of a connecting line attached to the emergency relief duct on the rear side of the predetermined breaking point. This component part can advantageously be an exhaust gas collector connected with several of the combustion chambers and/or the cylinders of the Diesel engine. This is because there, damages can hardly occur by the escaping hot gases and fractions. Preferably, the predetermined breaking components are each provided on a circumferential position in the cylinder head facing towards the exhaust gas collecting tank in order to permit a short connecting line. The connecting line may be, for example, a hose pipe placed outside the cylinder head which is connected to corresponding stubs on the predetermined breaking component and the exhaust gas collecting tank by means of appropriate hose clamps. But it would also be imaginable to place the connecting line at least partly within the cylinder head and/or the cylinder block, at least, if another portion integrated into the cylinder head is selected as a receiving environment, e.g. a exhaust duct downstream of the exhaust valve which in the case of crosshead engines with longitudinal scavenging is often provided as a single valve centrally on the upper side of the cylinder head and/or on its cover.

Another advantageous further embodiment concerns a tag of the predetermined breaking component which can contain data on the predetermined breaking pressure and/or tolerances for the predetermined breaking pressure and/or the intended service life etc. Moreover it can be indicated here for which engine type series the predetermined breaking component is provided as well as other operating and safety parameters, e.g. admissible temperature range etc. In this way it can be ensured that the predetermined breaking component is only used on the engines for which it is approved and that it is replaced within suitable maintenance intervals. Thus, the engine equipped with the predetermined breaking component can e.g. also be classified into specific risk classes by large vessel insurance companies, which until today, as described above, often stipulate inefficient safety valves. If moreover, an unequivocal part number is included in the tag, the individual history of each individual predetermined breaking component can be monitored.

It is particularly advantageous, if the tag can be read from the outside so that the predetermined breaking component can be monitored in the built-in condition as well. If there is not enough space on the predetermined breaking component for a tag by engraving, etching, stamping or the like, it would also be imaginable to provide the predetermined breaking component with an electronic data carrier and to store the tag on the electronic data carrier. For this purpose, the electronic data carrier could e.g. be electronically read out from the outside by a radio unit in the fashion of a RFID chip likewise attachable to the predetermined breaking component. Also a redundant tag on an electronic data carrier or the loading of engine operating data and thus a parts' history onto the electronic data carrier would be imaginable, e.g. the period of use since the last inspection etc. wherein the tag and/or information on the electronic data carrier could be protected from manipulation by means of appropriate coding. Moreover, parameters or a program for calculation of the service life of the predetermined breaking component could be stored on the data carrier which can be read into the engine control of the Diesel engine. But it would have to be made sure here that the electronic data carrier is protected against excessive temperatures and is therefore located in a relatively cool or heat insulated area of the predetermined breaking component.

It would also be imaginable to equip the predetermined breaking component with additional measuring or control devices, e.g. for control of the temperature of the electronic data carrier or in order to control the combustion pressure to be able to recognize developments, which might result in a faulty pressure increase in the combustion chamber already prior to a breakage of the predetermined breaking component. Moreover, it would be imaginable to connect the electronic data carrier via a suitable read-out unit and also the additional measuring equipment to the engine control and/or to install the engine control accordingly so that this is possible. In this connection, the engine control can be used to output alarm and warning messages in responding to signals from the predetermined breaking component, or even cut the engine control.

Moreover it would be imaginable to estimate the predetermined breaking component's service life from data obtained from the engine control and/or data collected in the engine control concerning the pressure and temperature values in the combustion chamber or the like integrated via the period of use, or the service life by the values obtained by means of the measuring equipment provided on the predetermined breaking component and integrated via the period of use of the predetermined breaking component, such as e.g. the number of pressure peaks beyond a level estimated to be safe etc.

Preferably, a material mixture is used for the predetermined breaking component or at least its portion containing the predetermined breaking point which comprises a number of different material components. A combined concentration profile of the mere components and/or other components, which can be comprised as a combination of low individual concentrations of pure metals or other pure substances, can then be used in order to identify the predetermined breaking component material. For safety reasons, a predetermined breaking component with another combined concentration profile can then be rejected as "non-original" since its material does possibly not fulfill the desired function with respect to the breakage at determined pressure and temperature parameters or does not have the desired service life.

The features described above and the features still to be explained below can be combined within the scope of the invention in any way as this seems reasonable.

BRIEF DESCRIPTION OF THE DRAWINGS

Individual embodiments of the invention are explained in detail below by means of the attached drawings where.

DETAILED DISCUSSION IN CONJUNCTION WITH THE DRAWINGS

Figure 1:
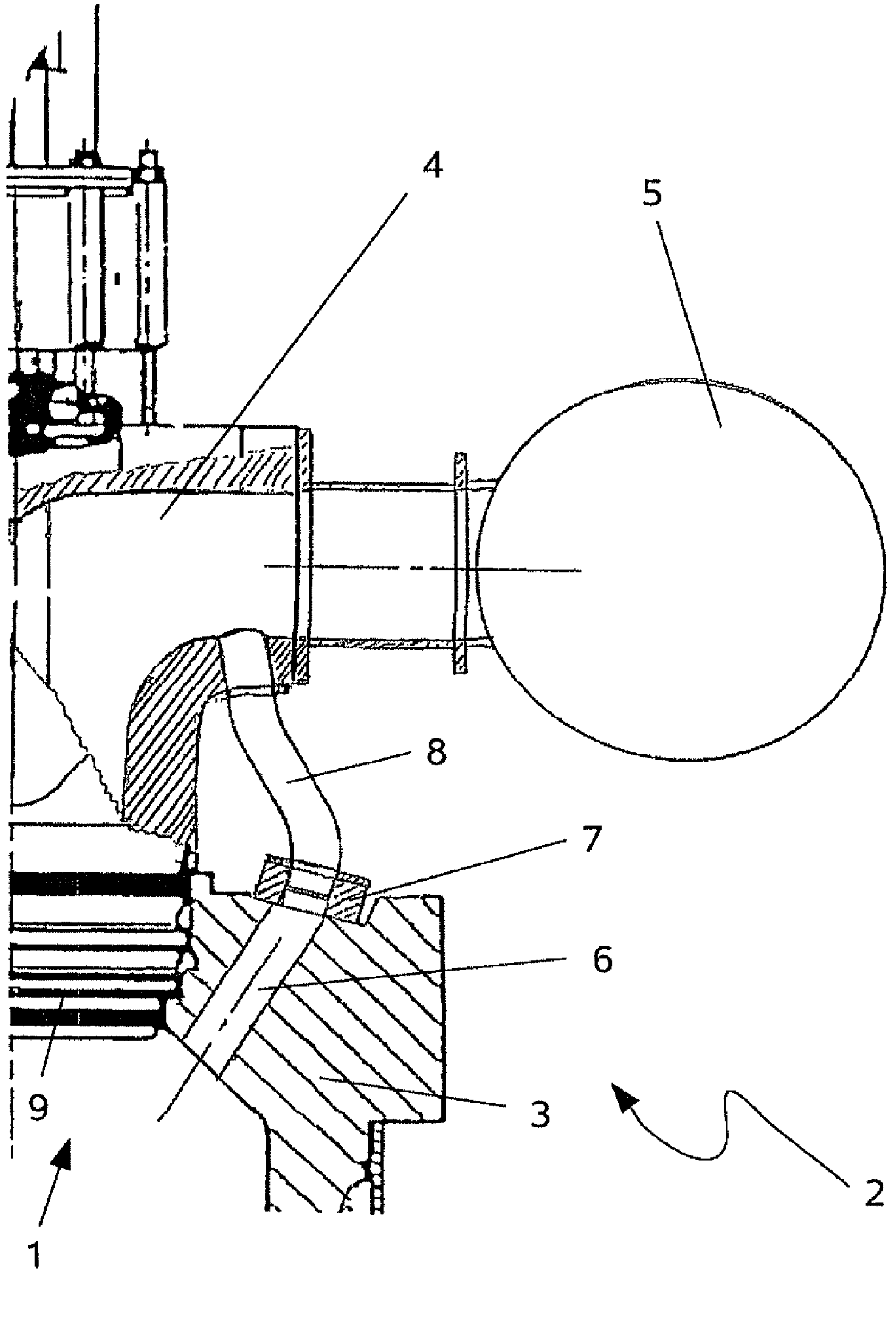
FIG. 1 is a partial sectional view of a cylinder head of a large Diesel engine according to one embodiment of the invention.

At first reference is made to FIG. 1. This partial sectional view shows part of a combustion chamber 1 of a Diesel engine which is defined towards the top by a cylinder head designated with 2 and/or its outer wall 3, and a central exhaust valve 9. Behind or downstream of the exhaust valve 9 a exhaust duct 4 is attached, through which the combustion gases are normally supplied to an exhaust gas collector 5 which, as is usual for large Diesel engines of the generic type, is connected to all cylinders connected in series (not shown). An emergency relief duct 6 passes out of the combustion chamber 1, which emergency relief duct 6 is closed by means of a predetermined breaking component 7 which is placed onto the cylinder head wall 3 or the combustion chamber outer wall 3 from the outside. The emergency relief duct 6 is connected with the exhaust duct 4 via a connecting line 8 attached on the rear side of the predetermined breaking component 7. If the predetermined breaking pressure is achieved on the predetermined breaking component 7 and a breakage of a predetermined breaking point 12 occurs accordingly, wherein the predetermined breaking point 12 is formed here in the separate predetermined breaking component 7, as will still be explained in more detail in connection with FIG. 5, the hot gases and fractions escaping from the combustion chamber 1 will be discharged via the connecting line 8 into the exhaust duct 4 located upstream of the exhaust valve 9.

Figure 2:
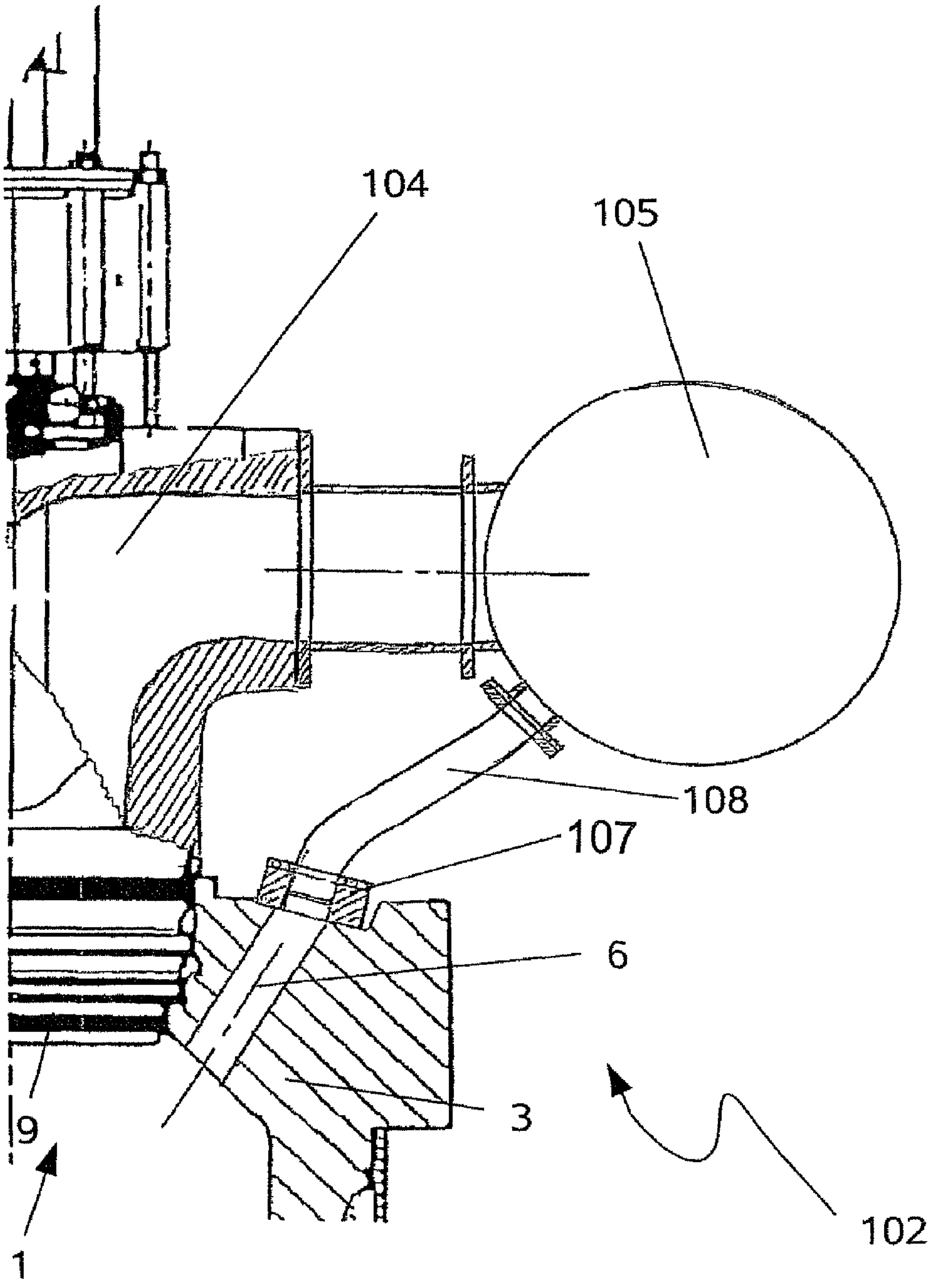
FIG. 2 is a view shown in FIG. 1 according to another embodiment of the invention.

In FIG. 2 an alternative embodiment of a cylinder head 102 is schematically shown, which differs from the embodiment shown in FIG. 1 in that here a connecting line 108 is provided connecting an exhaust gas collector 105 to the predetermined breaking component 107 with the predetermined breaking point, instead of a exhaust duct 104 as in FIG. 1.

Figure 3:
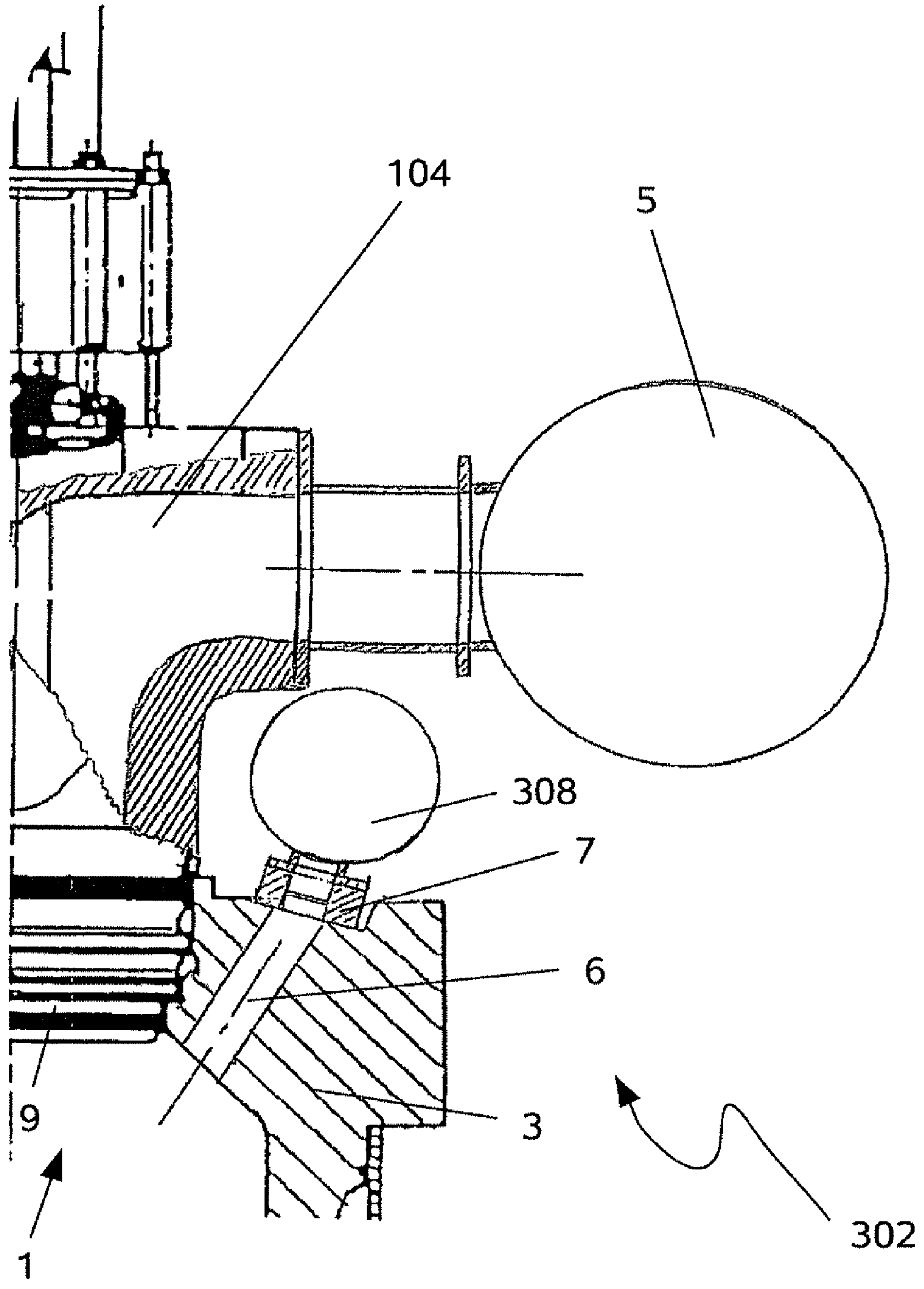
FIG. 3 is a view shown in the previous figures of another embodiment of the invention.

FIG. 3 is likewise a schematic view of another alternative embodiment of a cylinder head designated with 302, which differs from the embodiments of the two previous figures in that the emergency relief duct 6 via the predetermined breaking component 7 is connected directly with a separate emergency gas collecting tank 308, which is associated to all cylinders of the engine arranged in series on the respective predetermined breaking component 7, and in the event of breakage of the predetermined breaking point receives not only hot gases but also fractions. Due to its considerable length, the emergency gas collecting tank 308 can accommodate a sufficient quantity of emergency gas despite its relatively small diameter.

Figure 4:
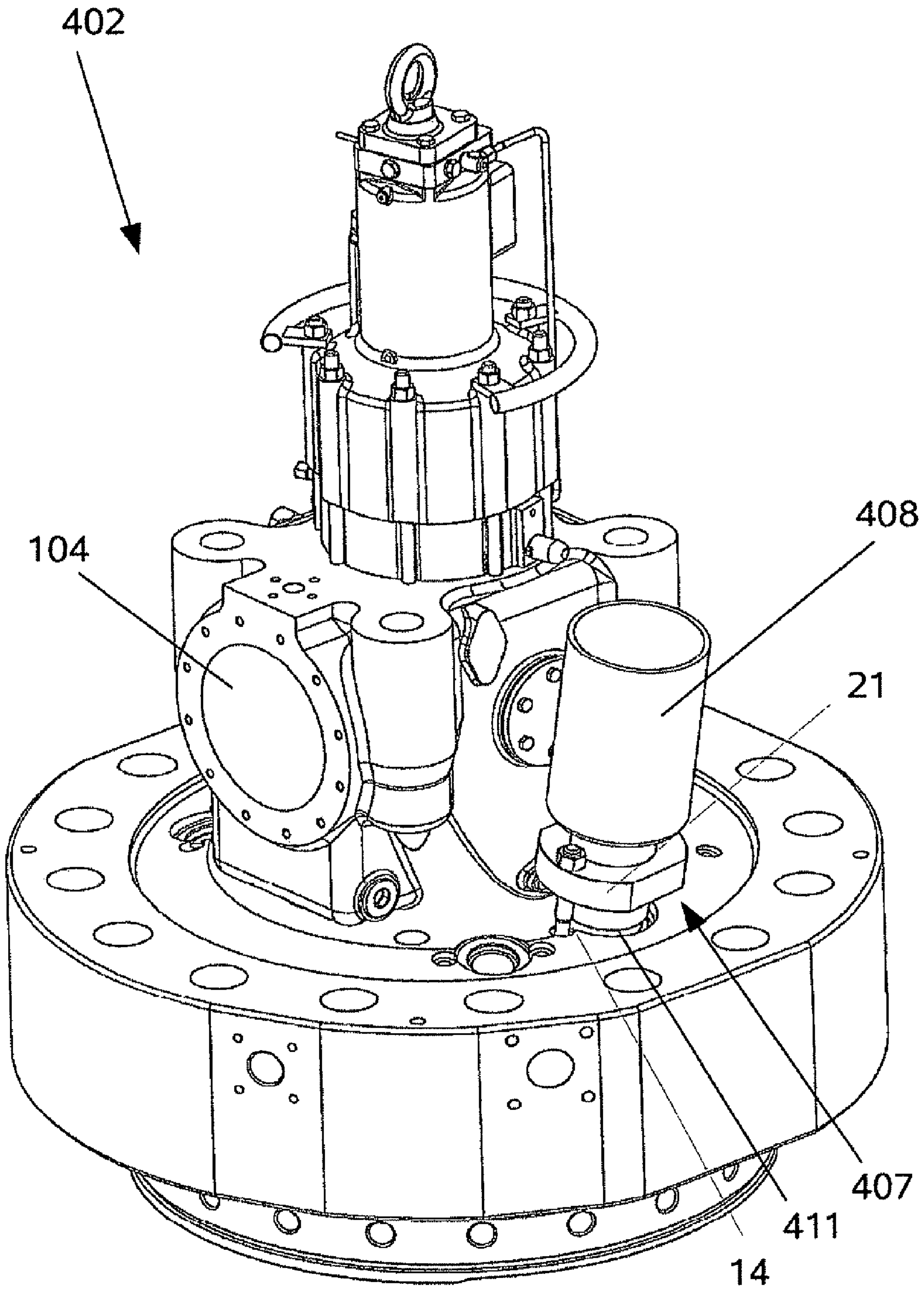
FIG. 4 is a perspective view of a cylinder head according to another embodiment of the invention.

In the embodiment of a cylinder head 402 shown in FIG. 4, however, a predetermined breaking component 407 is provided, which as a constructional unit is combined with a separate collecting filter 408 as own receiving environment 408 for the fractions occurring. Even if the hot gases occurring in the event of breakage of the predetermined breaking point continue to escape here, at least the fractions formed can be retained and the gases formed can be deflected into a direction where the resulting danger is at a minimum.

This constructional unit 407 is in total exchangeable and is not connected with other cylinders. One can see that the predetermined breaking component 407 for the purposes of easier accessibility is located on a circumferential position twisted by 90° in relation to the exhaust duct 104. The exhaust duct is part of a special assembly mentioned already above comprising the exhaust valve, its drive and the seat for the dish-shaped valve head, and is easily replaceable. The predetermined breaking component 407 comprises a predetermined breaking disk 411 acting simultaneously as a sealing ring which is clamped against a sealing surface (not shown in detail) on the cylinder head via screw studs 14 penetrating a clamping flange 21.

Figure 5:
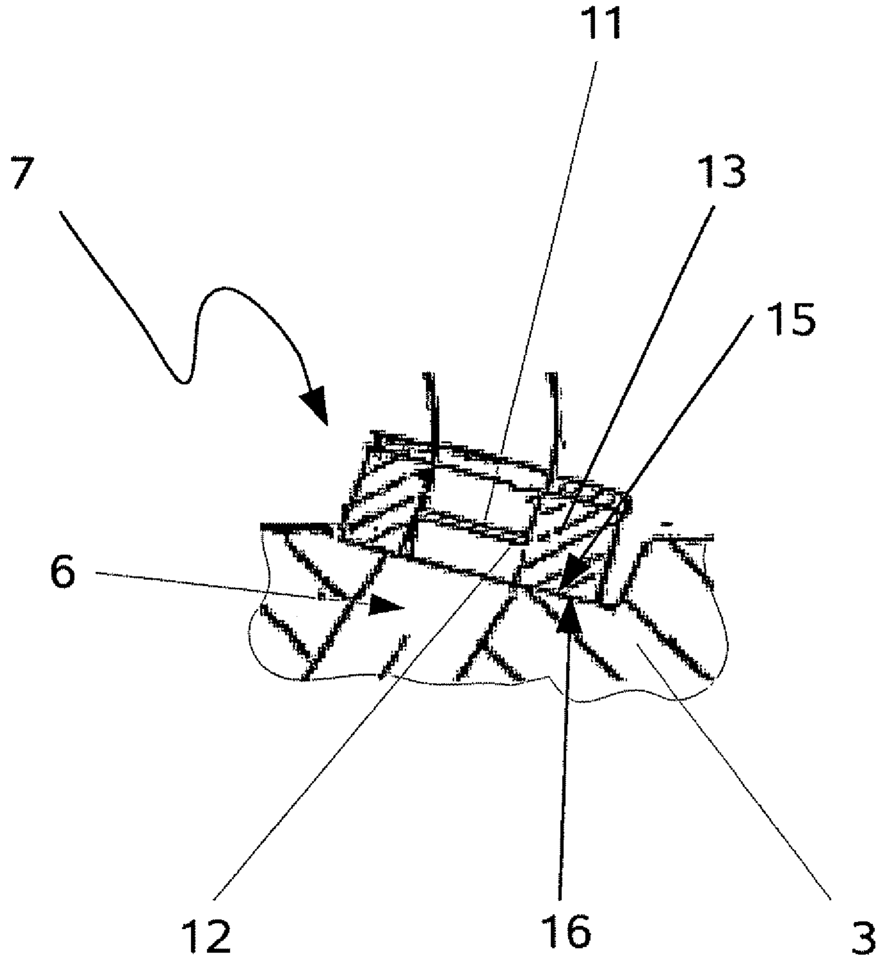
FIG. 5 is a detailed view of the predetermined breaking component employed in the embodiments according to FIGS. 1 and 2.

FIG. 5 illustrates a detailed view of the predetermined breaking component 7 installed on the cylinder heads of FIGS. 1 and 2. The predetermined breaking component comprises a ring-shaped flange or border flange 13 formed integrally with a predetermined breaking plate portion 11 and is placed above the emergency relief duct 6 as a lid and held in position there by means of screw studs (not shown in detail) penetrating or surrounding the border flange 13. The border flange 13 comprises a finished sealing surface 15, which faces towards a likewise finished sealing surface 16 on an area of the combustion chamber outer wall 3 surrounding the emergency relief duct 6, at least if no interposed sealing material exists. Of course, such a design described above can also be integrated deeper into the combustion chamber outer wall in order to be located closer to the combustion chamber and thus decrease the dead volume which fills out the emergency relief duct towards the combustion chamber. Moreover, the predetermined breaking plate portion can of course also have a position in relation to the surrounding structure which in assembled condition is e.g. closer to the combustion chamber.

Figure 6:
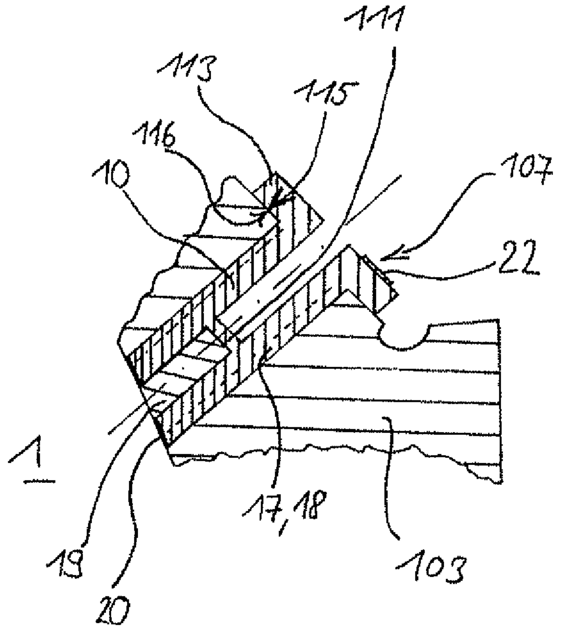
FIG. 6 is a predetermined breaking component according to an alternative embodiment of the invention.

An alternative embodiment of a predetermined breaking component 107 is illustrated in the schematic view of FIG. 6. The predetermined breaking component 107 is formed integrally with a sleeve portion 10 and a lid portion 113 supporting a predetermined breaking plate portion 111 and obstructs the emergency relief duct in the outer wall 103 of the combustion chamber 1 of a Diesel engine. On its inside it terminates flush with the inner surface of the outer wall 103 by its ring-shaped front surface of the sleeve portion 10 and is preferably provided with a heat and corrosion resistant coating 20, if the sleeve material itself is not satisfactorily heat and corrosion resistant. Optionally, an additional heat protection material 19 can be provided in the inner space enclosed by the sleeve portion 10 and the predetermined breaking plate portion 111 comprising a pressure permeable heat insulation material. On the cylinder head outside the predetermined breaking component 107 with its border flange 113 or its sealing surface 115 formed on the border flange 113 rests on the counter sealing surface 116 formed on the cylinder head. The emergency relief duct often extends here in normal direction to the ring-shaped bearing surface 116 in order to be able to use a predetermined breaking component constructed rotation-symmetrically and therefore producible in a cost-effective way. With an embodiment of this type it is possible to mount the predetermined breaking disk flush with the inner surface of the combustion chamber outer wall. It is likewise possible to design the predetermined breaking component such that it can be mounted from the inside. But the predetermined breaking point could also be formed as an integral part of the combustion chamber outer wall. If the sleeve portion is realized with an external thread in order to screw the predetermined breaking component into the emergency relief duct, a flange formed as the flange designated with 113 may be unnecessary, since the circumferential surface for sealing against the combustion chamber outer wall can be provided on a plane or conical shoulder spacing away the external thread of the sleeve portion of a lobe with a smaller diameter which is directed towards the combustion chamber. Such a screw connection can be advantageously used by an additional venting of the external thread of the combustion chamber outer wall to facilitate removal and insertion of a predetermined breaking component not broken which is subject to the pumping effect of the piston when the latter is still in motion due to a continued function of the other cylinders.

Figure 7:
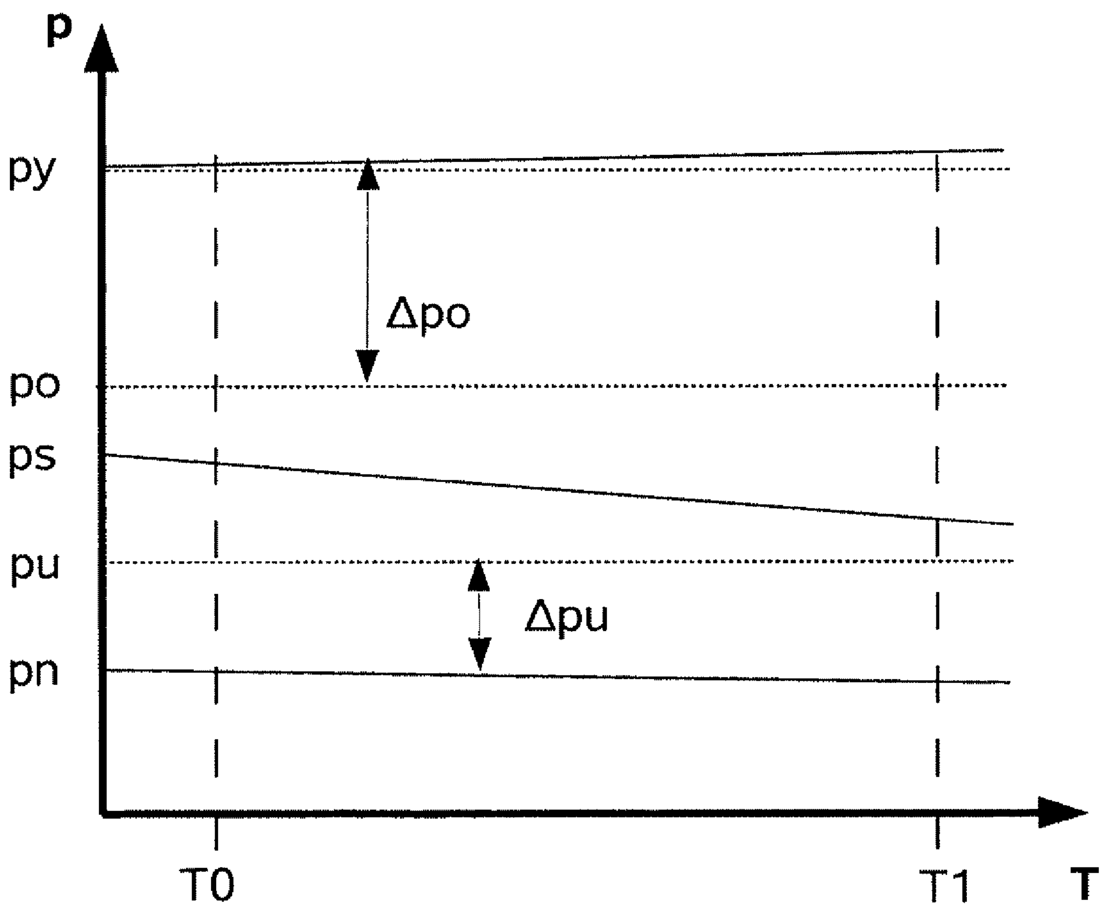
FIG. 7 is a graph on which pressure values versus combustion chamber temperature are plotted.
Figure 8:
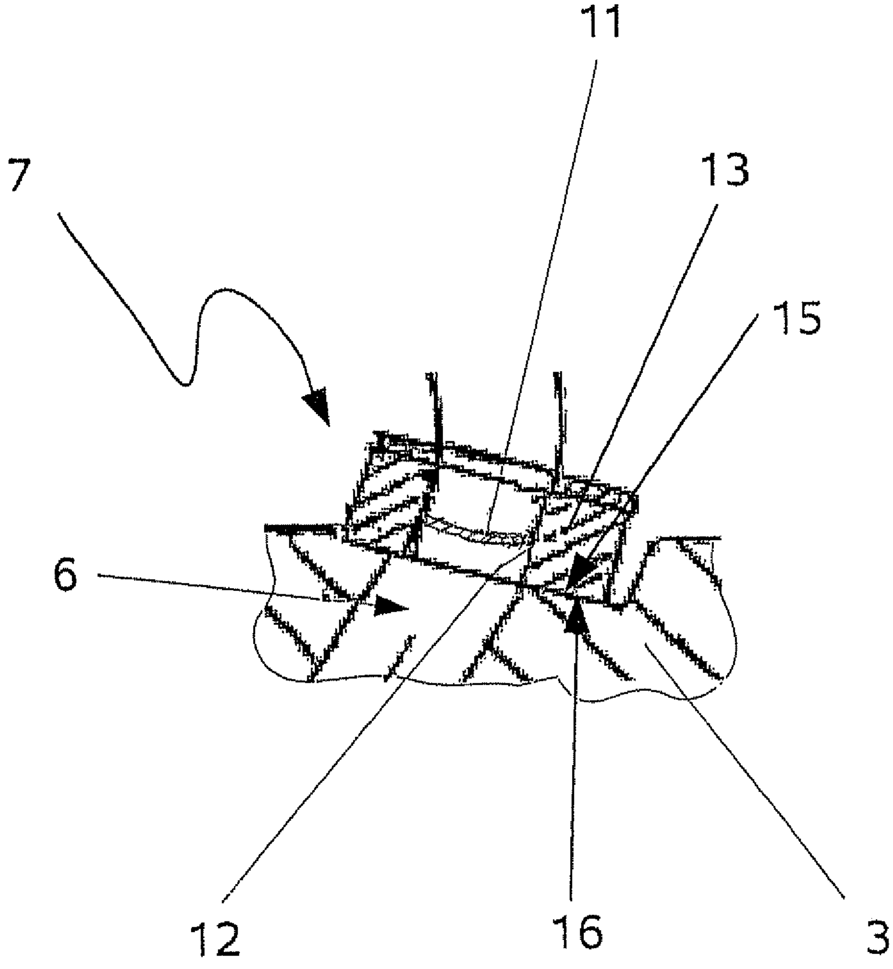
FIG. 8 is a predetermined breaking component showing the convexly curved feature.

FIG. 7 shows by way of an example some pressure patterns in a temperature range T0-T1 reflecting the temperature range normally existing in a combustion chamber, hence from an ambient temperature T0 when the engine is not running up to a temperature T1 when the engine has been running already for a longer period of time. The patterns plotted are mere examples and are supposed to only make clear that in the event of different temperatures, the high overpressure values py, where a engine damage (liftoff of the cylinder head and/or deformation of internal engine components) may occur, may vary, and variably high values of the predetermined breaking pressure ps, which is tolerated by the predetermined breaking point, and a variably high maximum normal pressure pn in the combustion chamber may occur. Therefore, relatively narrow tolerances (threshold pressure pu and limit pressure po) must be observed by the predetermined breaking point in order to observe sufficient safety (safety distance Δpo) from the lowest destructive overpressure (py) to be assumed and the highest normal pressure (pn) to be assumed.

Within the scope the invention departures and modifications of the embodiments shown are possible.

In particular it would be imaginable to use a mounting duct of a safety valve already existing in present engines as an emergency relief duct and to adapt the predetermined breaking component shape to the mounted duct.

Thus, the invention embodies itself in the features of the coordinated main claims, which according to advantageous embodiments can be combined in any way with the features of the dependent claims and the features of the following points insofar as this seems to be reasonable:

Point 1: The predetermined breaking component comprises a one way mounting assembly, which is configured such that it breaks when a value of a mounting parameter necessary for correct mounting is achieved, in order to prevent multiple mounting of the predetermined breaking component, with the given mounting parameter preferably being a tightening torque.

Point 2: The predetermined breaking component moreover comprises a device which even after breakage of the predetermined breaking point permits safe removal of the predetermined breaking component.

Point 3: The predetermined breaking component comprises a thread with a pitch opposite to the thread by means of which the predetermined breaking component is screwed into the emergency relief duct, thus e.g. a left-handed thread, in order to provide a device for removal of the predetermined breaking component also after breakage of the predetermined breaking point.

Moreover, the invention includes not only cylinder heads, cylinder liners but also pistons insofar as the inventive predetermined breaking point is provided on these.

The invention claimed is:

1. A predetermined breaking component suited for closing an emergency relief duct leading through an outer wall of a combustion chamber of a Diesel engine, wherein the combustion chamber is enclosed on multiple sides by a cylinder, as well as by at least one upper side of at least one piston moving up and down in the cylinder, which form the outer wall of the combustion chamber, and wherein the emergency relief duct is provided in the outer wall, characterized in that the predetermined breaking component is suited to protect a two stroke crosshead large Diesel engine with longitudinal scavenging against possible damage that can be caused by an undesirably high overpressure (py) of gases in the combustion chamber during a malfunction of the Diesel engine, the predetermined breaking component comprises:

a predetermined breaking point provided for said outer wall, which breaks on a predetermined breaking pressure (ps) which is below the overpressure (py) above which the damage is expected, and above a combustion chamber normal pressure (pn) foreseen maximally during normal engine operation conditions, wherein:

with a predetermined breaking pressure (ps) which at any temperature (T) in a temperature range (T0-T1) occurring in said combustion chamber is higher than a threshold pressure (pu) and lower than a limit pressure (po), wherein the threshold pressure (pu) is higher than a combustion chamber normal pressure (pn) occurring at maximum under normal engine operating conditions and the limit pressure (po) is lower than a lowest overpressure (py) above which the damage are to be expected; wherein the threshold pressure (pu) is preferably at least by a triggering pressure amount (Δpu) higher than the combustion chamber normal pressure (pn) occurring at maximum under normal engine operating conditions and/or the limit pressure (po) is at least by a safety pressure amount (Δpo) lower than the lowest overpressure (py) where damages are to be expected, and wherein the threshold pressure (pu) in the temperature range occurring in said combustion chamber is preferably always by more than 10% higher than the combustion chamber normal pressure (pn) occurring at maximum under normal motor operating conditions, and is more preferably greater than 180 bar, wherein the limit pressure (po) is more preferably smaller than 270 bar; and said predetermined breaking point is formed on a ring-shaped circumferential border around a predetermined breaking plate portion which border is thin-walled compared with the surrounding outer wall and convexly curved towards the combustion chamber and the predetermined breaking component is formed integrally with a predetermined breaking plate portion.

2. The predetermined breaking component according to claim 1, wherein:

the predetermined breaking component comprises a physical device by means of which a correct positioning in the emergency relief duct can be ensured.

3. The predetermined breaking component according to claim 1, wherein:

the predetermined breaking component is configured for an assembly from the inside of the combustion chamber thereby sealing said emergency relief duct, after introduction into said combustion chamber from the outside, with the predetermined breaking component preferably having a shape which permits the introduction through a rectilinear duct of same dimensions as said emergency relief duct to be closed.

4. The predetermined breaking component according to claim 1, wherein:

the predetermined breaking component is configured for assembly from the outside on the engine thereby sealing said emergency relief duct.

5. The predetermined breaking component according to claim 4, wherein:

the predetermined breaking component for plugging said emergency relief duct is formed as a sleeve or comprises a sleeve portion, the cross-sectional outline of which corresponds to the cross-sectional outline of said emergency relief duct and is preferably cylindrical, and comprises in particular a rotation-symmetric sealing device located in assembled condition on the side of the predetermined breaking component facing towards said combustion chamber and terminates the predetermined breaking component preferably towards said combustion chamber.

6. The predetermined breaking component according to claim 4, wherein:

the predetermined breaking component is configured as a lid or comprises a lid portion by means of which it can be placed onto said emergency relief duct from the outside.

7. The predetermined breaking component according to claim 1, wherein:

the predetermined breaking component comprises a conical shoulder, on which a circumferential surface for sealing against said combustion chamber is provided.

8. The predetermined breaking component according to claim 1, wherein:

at least the portion of the predetermined breaking component comprising the predetermined breaking point is composed of a preferably metallic material mixture, which in turn comprises a number of individual substances, with at least a recorded spectrum profile of the mere components of these individual substances identifying the material mixture of the portion of the predetermined breaking component which comprises said predetermined breaking point.

9. The predetermined breaking component according to claim 1, wherein:

in assembled condition a tag preferably readable from the outside is provided on the predetermined breaking component, from which a classification of the predetermined breaking component according to parameters such as e.g. predetermined breaking tolerances, date of installation and/or intended service life results, with the tag being located in particular on a contactlessly readable, preferably electronically readable memory chip. e.g. a RFID chip.

10. A Diesel engine, in particular a two stroke crosshead large Diesel engine, comprising:

at least a combustion chamber, which is enclosed by a cylinder on multiple sides, and by at least one upper side of at least one piston moving up and down in the cylinder, which form an outer wall for said combustion chamber;

a predetermined breaking point in the combustion chamber on its outer wall, said predetermined breaking point is suited to protect the Diesel engine against possible damages, that can be caused by an undesirably high overpressure (py) of gases in said combustion chamber during a malfunction of the Diesel engine, an emergency relief duct, wherein:

said predetermined breaking point comprises a predetermined breaking pressure (ps) below the overpressure (py) above which damages can be expected, and above a combustion chamber normal pressure (pn) foreseen maximally during normal engine operation conditions, in particular;

a predetermined breaking pressure (ps) which at any temperature (T) in a temperature range (T0-T1) occurring in said combustion chamber is higher than a threshold pressure (pu) and lower than a limit pressure (po);

the threshold pressure (pu) is higher than a combustion chamber normal pressure (pn) occurring at maximum under normal engine operating conditions, and the limit pressure is lower than a lowest overpressure (py) above which damages are to be expected;

the threshold pressure (pu) is preferably at least by a triggering pressure amount (Δpu) higher than the combustion chamber normal pressure (pn) occurring at maximum under normal engine operating conditions and/or the limit pressure (po) is at least by a safety pressure amount (Δpo) lower than the lowest overpressure (py) where damages are to be expected, and wherein the threshold pressure (pu) in the temperature range occurring in the combustion chamber is preferably always by more than 10% higher than the combustion chamber normal pressure (pn) occurring at maximum under normal motor operating conditions, and is more preferably greater than 180 bar, wherein the limit pressure (po) is more preferably smaller than 270 bar; and said emergency relief duct on the side of said predetermined breaking point facing away from said combustion chamber is connected to a safe receiving environment for the fractions exiting on breakage of the predetermined breaking point and preferably also for the hot gases escaping at the same time.

11. The Diesel engine according to claim 10, wherein:

said predetermined breaking point is formed on a ring-shaped circumferential border around a predetermined breaking plate portion which compared with the surrounding outer wall is thin-walled and convexly curved towards the combustion chamber.

12. The Diesel engine according to claim 10, wherein:

in the outer wall an emergency relief duct passing out of the combustion chamber is provided which is closed by means of said separate predetermined breaking component.

13. The Diesel engine according to claim 12, further comprising:

a device for fixing said at least one predetermined breaking component on the outer wall of the combustion chamber, preferably on a cylinder head or cover assembled on a cylinder liner on the sides of an upper dead center of the piston.

14. The Diesel engine according to claim 12, wherein:

the inner surface of the combustion chamber outer wall is cambered around the emergency relief duct.

15. The Diesel engine according to claim 12, wherein:

said predetermined breaking component is configured as a sleeve obstructing the emergency relief duct or comprises a sleeve portion obstructing the emergency relief duct, the front side of which facing towards the combustion chamber is spaced apart from the inner surface of the combustion chamber outer wall.

16. The Diesel engine according to claim 12, wherein:

said emergency relief duct has a buckled or curved pattern between the combustion chamber and the predetermined breaking component.

17. The Diesel engine according to claim 10, wherein:

between the combustion chamber and said predetermined breaking point a pressure permeable heat insulation material is provided, in particular a porous solid body such as e.g. a metal foam or a metal net and/or the predetermined breaking component at least on its front side facing towards said combustion chamber in assembled condition comprises a heat and/or corrosion protection shield, with said heat protection shield especially comprising a coating out of a heat-resistant alloy, e.g. a nickel alloy, and/or a porous solid body, e.g. a metal foam or a metal net.

18. The Diesel engine according to claim 12, wherein:

a front side of said predetermined breaking component facing towards said combustion chamber and the inner surface of said outer wall is flush mounted.

19. The Diesel engine according to claim 12, wherein:

said cylinder on its outside comprises a closed circumferential bearing surface around said emergency relief duct and said predetermined breaking component a corresponding clamping flange with a mating sealing surface facing towards said combustion chamber, with in particular a circumferential sealing, preferably as a sealing ring, being provided between the bearing surface and the sealing surface on said predetermined breaking component.

20. The Diesel engine according to claim 10, wherein:

said receiving environment is an exhaust duct connected to said combustion chamber outlet which is connected with said emergency relief duct via a connecting line leading to said predetermined breaking point.

21. The Diesel engine according to claim 20, wherein:

the receiving environment for the hot gases and fractions escaping on breakage of said predetermined breaking point is an exhaust gas collector connected with several of the Diesel engine combustion chambers, which is connected with said emergency relief duct via a connecting line leading to said predetermined breaking point.

22. The Diesel engine according to claim 12, wherein:

said combustion chamber is closed on multiple sides by a cylinder head and a cylinder liner screwed with said cylinder head, and said predetermined breaking component is provided on said cylinder head, preferably eccentrically on a lid of said cylinder head.

23. The Diesel engine according to claim 12, wherein:

as a receiving environment for the fractions emerging on breakage of said predetermined breaking point a separate collecting filter is provided for each combustion chamber which is connected with said emergency relief duct via said predetermined breaking point.

24. The Diesel engine according to claim 10, wherein:

a flushing device for flushing the side of said predetermined breaking point and/or the predetermined breaking plate portion facing away from said combustion chamber with a coolant, in particular with cooling water or cooling gas, is provided.

25. The Diesel engine according to claim 24, wherein:

a flushing agent line is provided from a location upstream of a scavenge gas supply to the cylinder to said predetermined breaking point, and as said coolant a charge air fed to the cylinder.

26. The Diesel engine according to claim 24, wherein:

said predetermined breaking point is provided on a predetermined breaking component closing said emergency relief duct;

on the side of said predetermined breaking plate portion facing away from the combustion chamber in assembled condition, an additional cover is provided in the emergency relief duct;

said predetermined breaking plate portion and the additional cover delimit a cooling chamber sealed preferably against the wall of the emergency relief duct from coolant outlet; and said additional cover comprises a lower predetermined breaking pressure compared with the predetermined breaking pressure of said predetermined breaking point, wherein in particular a cooling liquid is provided as a coolant.

27. The Diesel engine according to claim 26, wherein:

a cooling liquid is provided as a coolant and a throttle device is provided by means of which the coolant supply can be throttled in response to a breakage of the predetermined breaking point.

28. A component of a two stroke crosshead large Diesel engine according to claim 15, wherein:

said component comprises connecting means for at least a predetermined breaking component.

29. A method for avoiding possible damages of a Diesel engine, wherein the Diesel engine comprises at least one combustion chamber which is enclosed by a cylinder on multiple sides, which cylinder forms an outer wall for the combustion chamber, as well as by at least one upper side of at least one piston moving up and down in the cylinder, comprising the steps of:

providing at least one predetermined breaking component in the outer wall of at least one combustion chamber, and/or the Diesel engine is configured; and for avoiding damages of a two-stroke crosshead large Diesel engine with longitudinal scavenging, which might occur due to an undesirably high overpressure (py) of gases in a combustion chamber during a malfunction of the two-stroke crosshead large Diesel engine with longitudinal scavenging, at a pressure build-up in the combustion chamber beyond the combustion chamber normal pressure (pn) foreseen maximally under normal engine operating conditions, breakage of the predetermined breaking point is accepted and thus further pressure build-up to the overpressure (py) causing damages is prevented, wherein:

the predetermined breaking component is suited for closing the emergency relief duct leading through the outer wall of the combustion chamber of the Diesel engine and suited to protect the Diesel engine against possible damage that can be caused by an undesirably high overpressure (py) of gases in the combustion chamber during a malfunction of the Diesel engine; and the predetermined breaking component comprises a predetermined breaking point for the outer wall, with a predetermined breaking pressure (ps) below the overpressure (py) above which damages can be expected, and above a combustion chamber normal pressure (pn) foreseen maximally during normal engine operation conditions.

30. The method according to claim 29, wherein:

a safety valve existing on the combustion chamber is replaced by a predetermined breaking component;

the predetermined breaking component is suited for closing the emergency relief duct leading through the outer wall of the combustion chamber of the Diesel engine and suited to protect the Diesel engine against possible damage that can be caused by an undesirably high overpressure (py) of gases in the combustion chamber during a malfunction of the Diesel engine; and the predetermined breaking component comprises a predetermined breaking point for the outer wall, with a predetermined breaking pressure (ps) below the overpressure (py) above which damages can be expected, and above a combustion chamber normal pressure (pn) foreseen maximally during normal engine operation conditions.

31. The method according to claim 30, wherein:

the duct passing out of the combustion chamber originally serving as a mounting duct for the safety valve is rededicated as an emergency relief duct and closed by means of a predetermined breaking component.

32. The method according to claim 29, wherein:

the predetermined breaking component is replaced before a determined service life limit is achieved, with the service life limit e.g. being taken from a tag of the predetermined breaking component.

33. The method according to claim 29, wherein:

the service life limit before and after which the predetermined breaking component must be replaced is estimated by integration of the loads occurred on the predetermined breaking component versus time.

34. The method according to claim 29, wherein:

constant monitoring of the loads occurring on the predetermined breaking component is made by means of a measuring system.

35. The method according to claim 33, wherein:

in the event of a replacement not having been made but which is required, a warning signal is automatically sent that a predetermined breaking component has exceeded its service life and the engine is automatically throttled in order to subject the predetermined breaking component concerned only to a pressure which is reduced compared with a combustion chamber normal pressure provided at maximum under normal engine operating conditions.

36. The method according to claim 30, wherein:

during replacement of the predetermined breaking component on one of the cylinders, the other cylinders continue to operate.

37. The method according to claim 30, wherein:

with a predetermined breaking component the origin of said predetermined breaking component is verified by conformity of at least one material component spectrum profile for said predetermined breaking component recorded later with a material component spectrum profile of a similar predetermined breaking component recorded earlier.

* * * * *